`US008863013B2`

(12) United States Patent
Eischeid et al.

(10) Patent No.: US 8,863,013 B2
(45) Date of Patent: Oct. 14, 2014

(54) GENERATING A USER DEFINED PAGE HAVING REPRESENTATIONS OF CONTENT IN OTHER PAGES

(75) Inventors: Todd Michael Eischeid, Cary, NC (US); Jeffrey John Smith, Raleigh, NC (US); David Thomas Windell, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1202 days.

(21) Appl. No.: 12/060,844

(22) Filed: Apr. 1, 2008

(65) Prior Publication Data
US 2009/0249251 A1    Oct. 1, 2009

(51) Int. Cl.
   *G06F 3/00*   (2006.01)
   *G06F 3/0481* (2013.01)
   *G06F 9/44*   (2006.01)
   *G06F 17/30*  (2006.01)

(52) U.S. Cl.
   CPC ............ *G06F 9/4443* (2013.01); *G06F 3/0481* (2013.01); *G06F 17/30867* (2013.01)
   USPC ............ 715/765; 715/733; 715/788; 715/206

(58) Field of Classification Search
   USPC .................. 715/739, 847, 733, 788, 206, 765
   See application file for complete search history.

(56) References Cited

U.S. PATENT DOCUMENTS

| | | | |
|---|---|---|---|
| 6,008,819 A * | 12/1999 | Robson et al. | 715/210 |
| 6,184,886 B1 * | 2/2001 | Bates et al. | 715/760 |
| 6,219,679 B1 * | 4/2001 | Brisebois et al. | 715/206 |
| 6,538,673 B1 * | 3/2003 | Maslov | 715/853 |
| 6,556,984 B1 * | 4/2003 | Zien | 1/1 |
| 6,976,210 B1 * | 12/2005 | Silva et al. | 715/205 |
| 7,401,128 B1 * | 7/2008 | Mueller | 709/217 |
| 7,558,853 B2 * | 7/2009 | Alcorn et al. | 709/225 |
| 7,899,829 B1 * | 3/2011 | Malla | 707/741 |
| 2002/0005867 A1 * | 1/2002 | Gvily | 345/760 |
| 2003/0101412 A1 * | 5/2003 | Eid | 715/513 |
| 2003/0126560 A1 * | 7/2003 | Kurapati et al. | 715/514 |
| 2003/0214529 A1 * | 11/2003 | Martin et al. | 345/738 |
| 2004/0177323 A1 * | 9/2004 | Kaasila et al. | 715/513 |
| 2005/0097190 A1 * | 5/2005 | Abdelhak | 709/217 |
| 2006/0041589 A1 * | 2/2006 | Helfman et al. | 707/104.1 |

(Continued)

OTHER PUBLICATIONS

Yahoo Home Page Screenshot, retrieved from "http://my.yahoo.com/p/d.html?y" on Aug. 29, 2007.

*Primary Examiner* — Ryan Pitaro
(74) *Attorney, Agent, or Firm* — David W. Victor; Konrad, Raynes, Davda and Victor LLP (57) ABSTRACT

Provided are a method, system, and article of manufacture for generating a user defined page having representations of content in other pages. User selection is received via a computer user interface of a portion of content within a page rendered in a display device. A graphical element is generated representing the selected portion of the content in response to receiving the user selection. A determination is made of a computer address of the selected content in response to receiving the user selection. The generated graphical element is added to a user page. The graphical element in the user page is associated with the determined computer address. User selection is received via the computer user interface of the graphical element within the user page. Content at the computer address associated with the selected graphical element is rendered in the within the user page display device.

21 Claims, 4 Drawing Sheets

(56) References Cited

U.S. PATENT DOCUMENTS

| | | | |
|---|---|---|---|
| 2006/0224997 A1* | 10/2006 | Wong et al. | 715/838 |
| 2006/0271834 A1 | 11/2006 | Wang et al. | |
| 2007/0266342 A1* | 11/2007 | Chang et al. | 715/810 |
| 2008/0034317 A1* | 2/2008 | Fard et al. | 715/781 |
| 2008/0046825 A1* | 2/2008 | Bedi et al. | 715/742 |
| 2008/0201650 A1* | 8/2008 | Lemay et al. | 715/763 |
| 2008/0235563 A1* | 9/2008 | Nakamura | 715/200 |
| 2008/0313722 A1* | 12/2008 | Cho et al. | 726/7 |
| 2009/0024962 A1* | 1/2009 | Gotz | 715/838 |
| 2009/0044126 A1* | 2/2009 | Wyler et al. | 715/734 |
| 2009/0164887 A1* | 6/2009 | Ikegami | 715/247 |
| 2009/0164941 A1* | 6/2009 | Johnson et al. | 715/810 |
| 2012/0072847 A1* | 3/2012 | Lee et al. | 715/738 |

* cited by examiner

GENERATING A USER DEFINED PAGE HAVING REPRESENTATIONS OF CONTENT IN OTHER PAGES

BACKGROUND OF THE INVENTION

1. Field of the Invention

The present invention relates to a method, system, and article of manufacture for generating a user defined page having representations of content in other pages.

2. Description of the Related Art

Internet browser users often continually frequent the same set of web pages. Web browsers, such as Microsoft® Internet Explorer® and Firefox®, provide a feature known as "bookmarks" to allow the user to save the link to a web site in a list and then return to that web site by selecting the bookmarked link through the menu items or an icon on the menu bar. (Microsoft and Internet Explorer are trademarks of Microsoft Corporation in the United States and other countries and Firefox is a trademark of Mozilla Foundation in the United States and other countries)

Some internet web sites provide a user home page in which the user can tailor the content presented. For instance, Google® provides a user home page, known as iGoogle, in which the user may rearrange and add sections to their personal home page. (Google and iGoogle are trademarks of Google Inc. in the United States and other countries).

There is a need in the art for improved techniques to allow users to tailor their access to frequently accessed files or web pages.

SUMMARY

Provided are a method, system, and article of manufacture for generating a user defined page having representations of content in other pages. User selection is received via a computer user interface of a portion of content within a page rendered in a display device. A graphical element is generated representing the selected portion of the content in response to receiving the user selection. A determination is made of a computer address of the selected content in response to receiving the user selection. The generated graphical element is added to a user page. The graphical element in the user page is associated with the determined computer address. User selection is received via the computer user interface of the graphical element within the user page. Content at the computer address associated with the selected graphical element is rendered in the within the user page display device.

DETAILED DESCRIPTION

Figure 1:
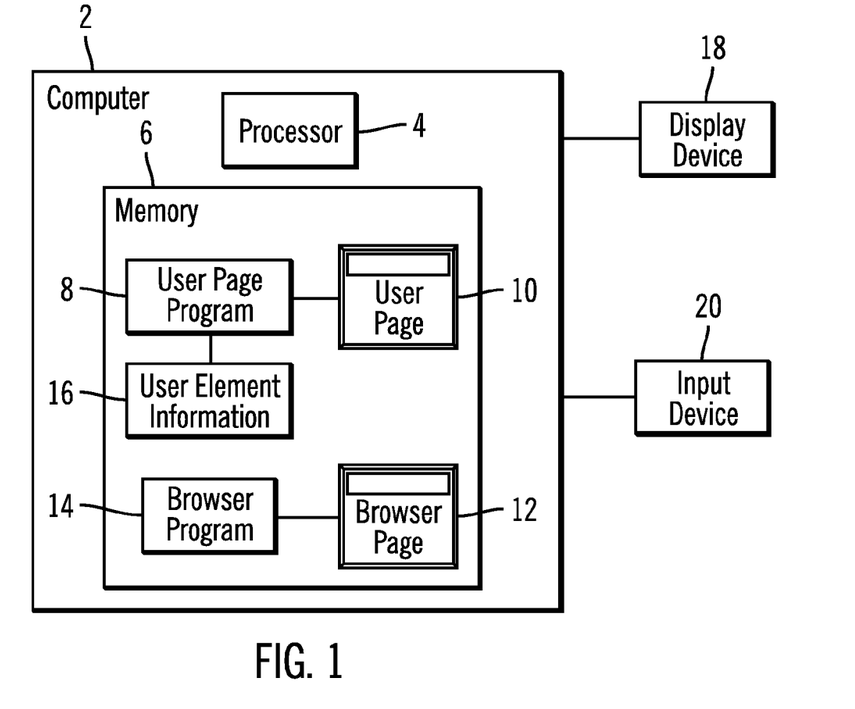
FIG. 1 illustrates an embodiment of a computing environment.

FIG. 1 illustrates an embodiment of a computing environment. A computer 2 includes a processor 4 and a memory 6 in which programs are rendered and executed. The processor 2 executes a user page program 8 which generates a user page 10 including graphical elements and other information accessed from one or more browser pages 12 rendered by a browser program 14. The user page program 8 maintains user element information 16 on graphical elements accessed from browser pages 12. The computer 2 may render the user page 10 and browser pages 12 on a display device 18, such as a computer monitor. The user of the computer 2 may utilize an input device 20 to interact with the browser program 14 and user page program 8 to interact with content and controls in the user page 10 and browser pages 12. The input device may comprise a mouse, keyboard, pen-stylus, microphone, touch screen, etc. controlled by a user to provide user input to a computer program.

The processor 4 may comprise one or more central processing units (CPUs) and the memory 6 may comprise one or more non-volatile or volatile memory devices in which data and programs may be loaded and executed.

The browser program 14 may comprise an application program that renders pages of content or browser pages 12, where the browser pages 12 rendered may be accessed from a local storage device attached to the computer 2 or downloaded from a computer or server over a network, such as a local area network (LAN), a storage area network (SAN), the Internet, wireless network, etc. For instance, the browser program 14 may comprise a web browser, e.g., Extended Markup Language (XML) or Hypertext Transport Protocol (HTTP) browser capable of downloading and rendering content locally or from a web server. Alternatively, the browser program 14 may comprise other types of document applications, such as a word processing program, publishing program, spreadsheet program, graphics program, etc. The user page program 8 may comprise a separate standalone program that executes independently of the browser program 14. Alternatively, the user page program 8 may comprise an add-on program with respect to the browser program 14 or the user page program 8 may comprise an embedded application that runs within the operating environment of the browser program 14, such as within a browser page 12 rendered by the browser program 14.

Figure 2:
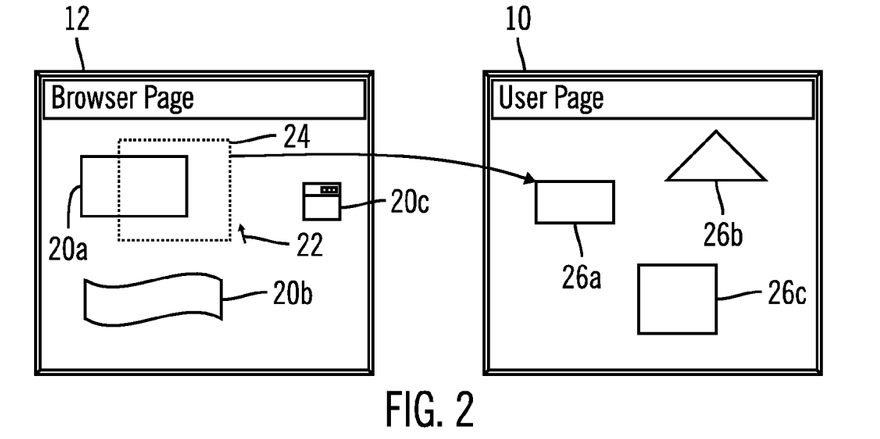
FIG. 2 illustrates an embodiment of a browser and user pages.

FIG. 2 illustrates an embodiment of an implementation of a browser page 12 as including multiple content elements 20a, 20b, 20c. The content elements 20a, 20b, 20c in the browser page 12 may comprise text, graphics, a script program or an embedded application 20c rendering content (e.g., text, audio, video, stock tickers, etc.) from a local file or remote content server. FIG. 2 shows a user interface pointer 22 controlled by the input device 20 selecting via a selection box 24 a portion of content element 20a. For each content element selected by the user within the context of the user page program 8 being invoked, a graphical element 26a, 26b, 26c is rendered in the user page 10, where the graphical elements 26a, 26b, 26c visually represent the content elements 20a, 20b, 20c selected from one or more browser pages 12 in the user page 10. In a situation where the selected content 20a, 20b, 20c comprises fixed content, such as text, and image, etc., the graphical element 26a, 26b, 26c generated into the user page 10 to visually represent such content 10 may include an image of the selected content 20a, 20b, 20c, such as a snippet of the selected content.

Alternatively, if the selected content 20a, 20b, 20c comprises a portion of content rendered in the browser page 12 within an embedded application, such as an add-on, Java™ application, etc., then the graphical element 26a, 26b2, 26c generated for that content may represent the selected content being rendered in the embedded application or a representation of the embedded application. (Java™ is a trademark of Sun Microsystems Corp. in the United States and other countries).

In one embodiment, a user may invoke the user page 10 from the browser program. For instance, the user page 10 may comprise a home page or bookmarked page accessible through the browser program 14 rendering the browser pages 12. Alternatively, the user page 10 may be rendered in a separate application than the browser program 14 that renders the browser page.

Figure 3:
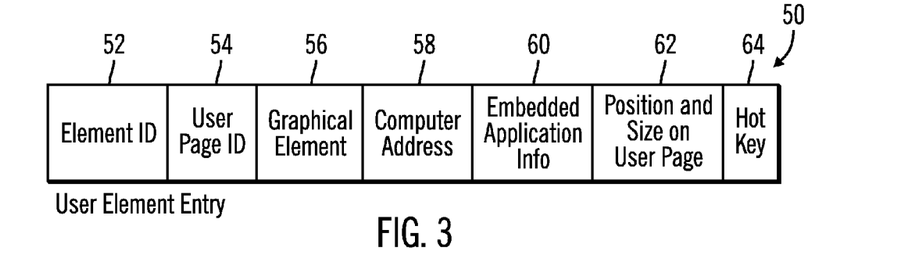
FIG. 3 illustrates an embodiment of a user element entry provided for a graphical element added to the user page.

FIG. 3 illustrates an embodiment of a user element information entry 50 maintained in the user element information 16 for one graphical element 26a, 26b, 26c generated into the user page 10 from selected content 20a, 20b, 20c from one or more browser pages 12. The user element information entry 50 includes an element identifier (ID) 52 identifying the particular graphical element generated from content 20a, 20b, 20c selected from one browser page 12 and a user page identifier (ID) 52 identifying one or more user pages 10 in which the graphical element is generated. The user page program 8 may allow the user to create multiple user pages 10 in which graphical elements 26a, 26b, 26c generated from different browser pages 12 may be organized. Graphical element 56 identifies the graphical element to be rendered in the identified user page(s) 54, such as a local address of the graphical element. Computer address 58 indicates the link or address (e.g., Universal Resource Locator (URL)) of the browser page 12 in which the page content 20a, 20b, 20c was selected or an executable application address (e.g., "c:\programs\app.exe") if the graphical element was generated for content selected within an embedded application in the browser page 12.

If the selected content comprises content rendered within an embedded application, then the entry 50 may include embedded application information 60 that the embedded application uses to access the content rendered in the browser 12 when the user selected the browser content, e.g., 20c, to include in the user page 10. For instance, the embedded application information 60 may comprise a file address or remote server address from which the content is accessed, parameters and settings related to the embedded applications rendering of the content, a user name and password used by the embedded application to access the content, etc. The entry 50 may further include the position and size of a region on the user page 62 in which the graphical element 56 is rendered. A hot key 64 identifies user input device 20 control(s) whose selection while the user page 10 is rendered causes the selection of the graphical element 56 associated with the hot key 64. Selection of a graphical element 56 causes the browser page 12 accessible through the computer address 58 to be accessed and loaded or causes the launching of the application at the executable computer address 58 to render the content.

Figure 4:
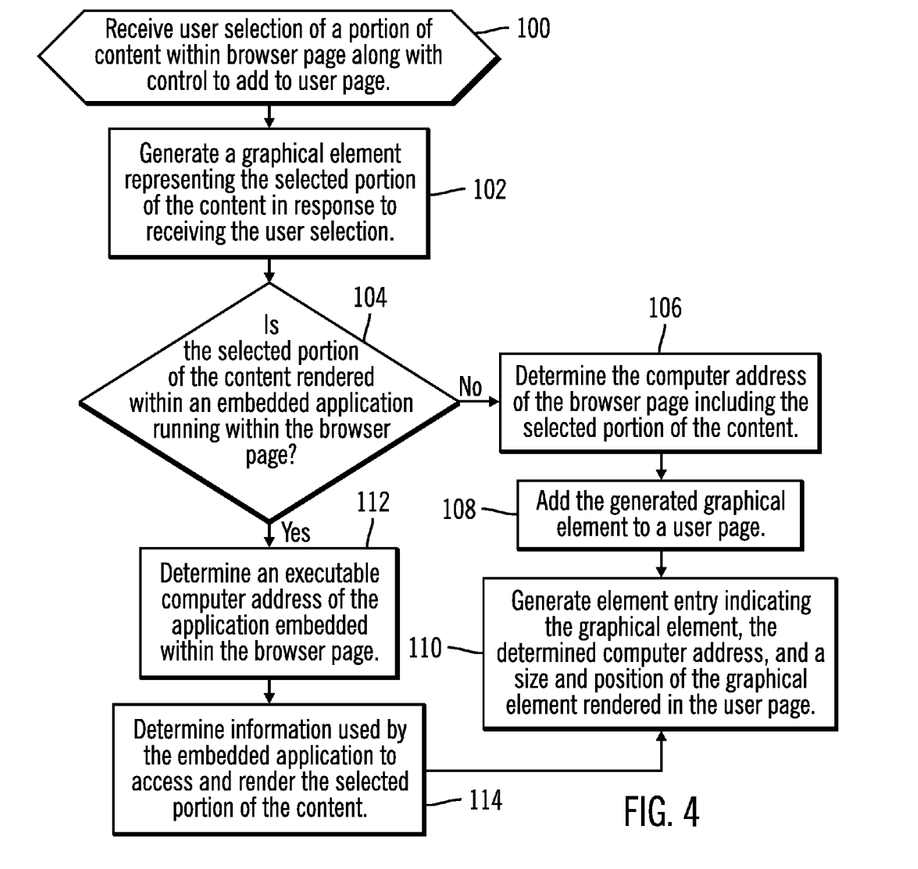
FIG. 4 illustrates an embodiment of operations to receive user selection of a portion of content within a browser page to add to a user page as a graphical element.

FIG. 4 illustrates an embodiment of operations performed by the user page program 8 to add a graphical element 26a, 26b, 26c to the user page 10. Upon receiving (at block 100) user selection 24, via the input device 20, of a portion of content 20a within the browser page 12 along with a control to add the selected content to the user page 12, the user page program 8 generates (at block 102) a graphical element 26a representing the selected 24 portion of the content 20a (FIG. 2) in response to receiving the user selection. The generated graphical element 26a may comprise a rendering of a portion of the selected content, such as text, images, etc., within the selected content 20a, or a rendering of an icon or image different than the content 20a rendered in the browser page 12 when selected. A determination is made (at block 104) of whether the selected portion 24 of the content is rendered within an embedded application, e.g., 20c, running within the browser page 12 context. If the selected portion 24 does not comprise content within an embedded application 20c, then the user page program 8 determines (at block 106) the computer address of the browser page 12 including the selected portion 24 of the content 20a and adds (at block 108) the generated graphical element 26a to the user page 10. The user page program 8 may generate (at block 110) an element entry 50 indicating the graphical element 56, the determined computer address 58, and a size and position 62 of the graphical element 56 rendered in the user page. The user page program 8 may create a default size and position 62 for the graphical element in the user page 12 that may be modified by the user. The user page program 8 may add (at block 108) the generated graphical element 26a to the user page 10 by generating a user element entry 50 (FIG. 3) used by the user page program 8 and then rendering the added graphical element 26a into the user page 10.

If (at block 104) the selected portion 24 of the content is within an embedded application, such as 20c, in the browser page 12, then the user page program 8 determines (at block 112) an executable computer address of the application embedded within the browser page 12 and determines (at block 114) information 60 used by the embedded application 20c to access and render the selected portion of the content. As discussed, the determined information used by the embedded application 20c may comprise a computer address of the content rendered in the embedded application, user authentication information, etc. From block 114, the user page program 8 may generate (at block 110) an element entry 50 for the graphical element generated for the portion of selected content in the embedded application, which entry 50 may indicate the executable computer address 58 of the embedded application and the embedded application information 60.

Figure 5:
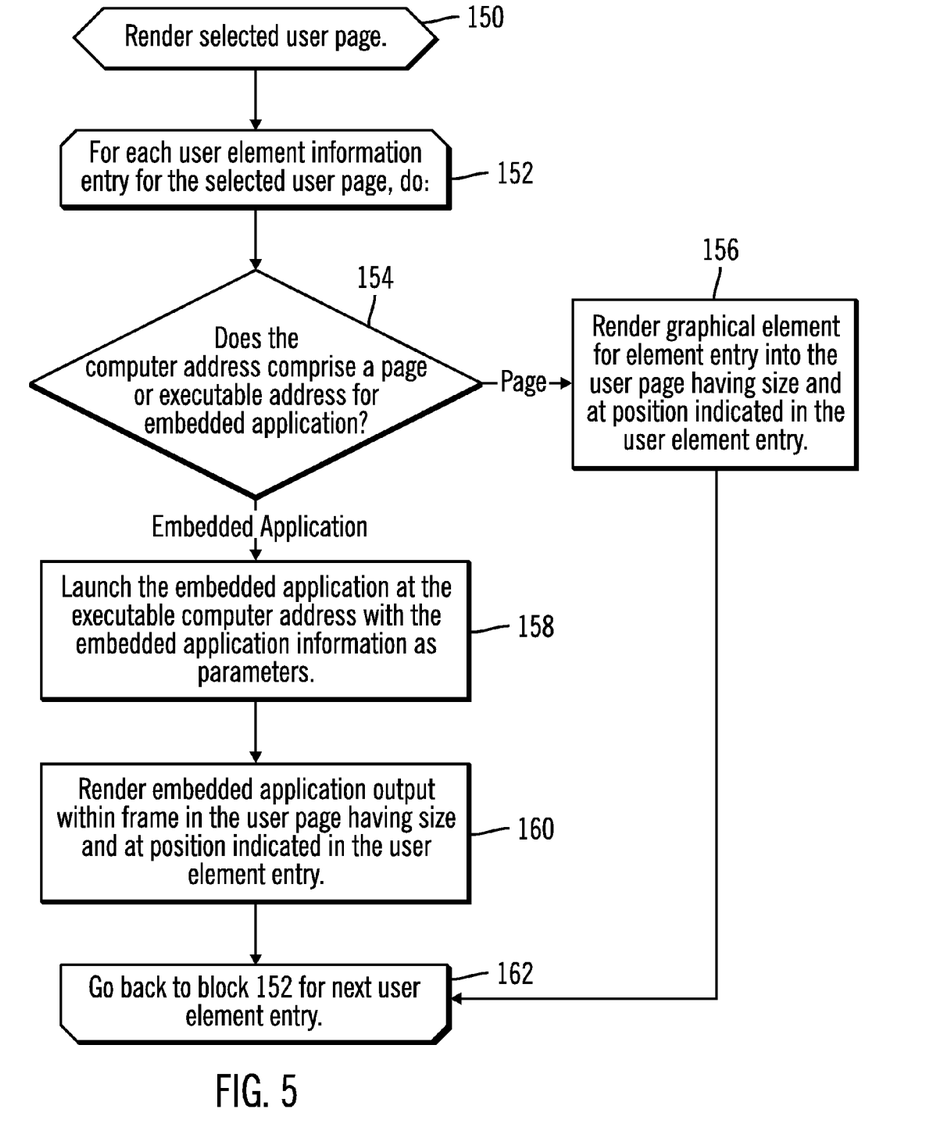
FIG. 5 illustrates an embodiment of operations to render graphical elements in the user page.

FIG. 5 illustrates an embodiment of operations performed by the user page program 8 to render graphical elements in the user page 10. Upon initiating (at block 150) operations to render a user selected user page 10, the user page program 8 performs a loop of operations (at block 152 through 162) of operations 154 through 160 for each user element entry 50 in the user element information 16 for the selected user page 10, which comprise element entries 50 whose user page identifier 54 matches the selected user page 10 if there are multiple user pages. A determination is made (at block 154) of whether the computer address 58 of the user element entry 50 being processed comprises an address of a page or an executable address for an embedded application 20c. If (at block 154) the computer address is for a page having content, then the user page program 8 renders (at block 156) the graphical element 56 for the user element entry 50 into the user page 10 having the size and at the position indicated in field 62 of the user element entry 50.

If (at block 154) the computer address is for an executable address for an embedded or other application, then the user page program 8 launches (at block 158) the embedded application at the executable computer address 58 with the embedded application information 60 as parameters. The embedded application output is rendered (at block 160) within a frame or region in the user page 10 having a size and at position indicated in the size and position field 62 of the user element 50.

Figure 6:
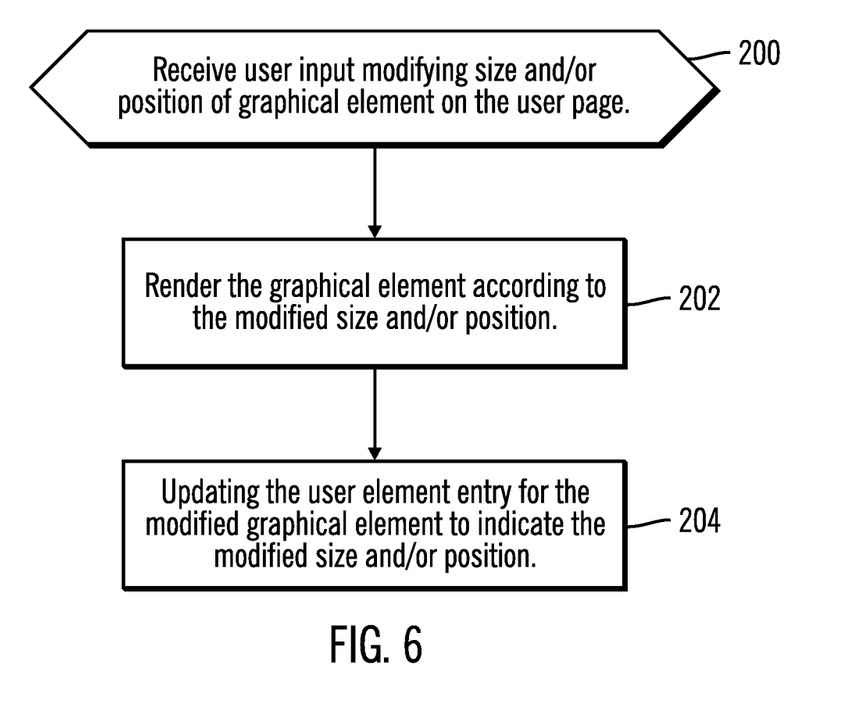
FIG. 6 illustrates an embodiment of operations to enable a user to modify the size and position of graphical elements in the user page.

FIG. 6 illustrates an embodiment of operations performed by the user page program 8 to enable a user to modify the size and position of graphical elements 26a, 26b, 26c rendered within the user page 10. Upon receiving (at block 200) user input modifying the size and/or position of a selected graphical element 26a, 26b, 26c on the user page 10, the user page program 8 renders (at block 202) the selected graphical element 26a, 26b, 26c according to the modified size and/or position. The user element entry 50 for the modified graphical element is updated (at block 204) to indicate the modified size and/or position of the selected graphical element 26a, 26b, 26c.

In the described embodiments, graphical elements representing content are added to a user page 10 in response to the user selecting content in a browser page 12 via a user interface and input device. In an alternative embodiment, a graphical element for a page or specific content 20a, 20b, 20c in a browser page 12 may be added to the user page 10 based on the frequency of user access of the page or content within the page. For instance, a determination may be made of whether a frequency at which the user accesses the page or content in a page exceeds a predetermined frequency. In such case, a graphical element for the frequently accessed page or content may be automatically created to add to the user page 10.

In certain embodiments, an organization or provider of the user page program may lock a graphical element on the user page that the user may not remove to provide required access to a page or content represented by the graphical element.

Described embodiments provide techniques to allow a user to create a user page having graphical elements enabling access to pages and content that the user has previously accessed. Described embodiments allow the user to arrange the graphical elements in a desirable manner in their user page to optimize their access to the graphical elements and content represented by the graphical elements.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable storage medium", where a processor may read and execute the code from the computer storage readable medium. A computer readable storage medium may comprise storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The "article of manufacture" may comprise a transmitting station and/or a receiving station for transmitting and receiving transmission signals in which the code or logic is encoded, where the code or logic encoded in the transmission signal may be decoded and stored in hardware or a computer readable storage medium at the receiving and transmitting stations or devices. An "article of manufacture" comprises a computer readable storage medium, hardware device, and/or transmission transmitters or receivers in which code or logic may be implemented. Those skilled in the art will recognize that many modifications may be made to this configuration without departing from the scope of the present invention, and that the article of manufacture may comprise suitable information bearing medium known in the art.

In the described embodiments, the access parameters are changed for process accesses to memory addresses in a shared memory. In an alternative embodiment, access patterns may be monitored for computer resources other than memory addresses, such as addresses in a storage device and other computer resources.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

Although the figures and description are described with a certain number of instances of items, such as a certain number browser pages 12, user pages 10, content elements 20a, 20b, 20c, graphic elements 26a, 26b, 26c, etc., in various implementations there may be any number of these described items, including fewer or greater than the numbers shown in the figures.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4, 5, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    receiving user selection via a computer user interface of a first portion of first content downloaded from a computer address and rendered within a browser page rendered in a display device in communication with a computer;
    generating a first graphical element including a rendering of a portion of the selected portion of the first content in response to receiving the user selection, wherein the graphical element provides a visual representation of a first image of the selected first portion of the first content;
    receiving user selection of a second portion of second content rendered from an application program executing in the computer;
    generating a second graphical element including a rendering of the selected second portion of the second content in response to receiving the user selection, wherein the graphical element provides a visual representation of a second image of the selected second portion of the second content;
    generating a first user element entry in user element information associating the generated first graphical element and the computer address;
    generating a second user element entry in the user element information associating the generated second graphical element and an executable application address of the application program in the computer; and
    for each of the user element entries in the user element information, rendering the generated graphical element in a user page in response to receiving user selection to invoke the user page.

2. The method of claim 1, wherein the application program comprises an embedded application within the browser page.

3. The method of claim 2, further comprising:
    determining information used by the embedded application to access and render the selected portion of the content in response to receiving the user selection of the content rendered within the embedded application; and
    associating the determined information with the second graphical element in the second user element.

4. The method of claim 3, wherein the determined information comprises an address at a remote server including the content selected within the page, wherein the embedded application uses the address to access the content at the remote server to render in the user page.

5. The method of claim 1, wherein the operations of adding the generated first and second graphical elements to the user page and associating the first and second graphical elements in the user page with the computer address and the executable application address, respectively, are performed automatically in response to generating the first and second graphical elements.

6. The method of claim 1, further comprising:
    determining whether a frequency at which the user accesses the browser page exceeds a predetermined frequency, wherein the operations of generating the first graphical element, adding the generated first graphical element to the user page, and associating the first graphical element with the computer address are performed in response to determining that the determined frequency exceeds the predetermined frequency.

7. The method of claim 1, further comprising:
    receiving user selection to associate user input device controls with the first graphical element rendered in the user page, wherein user selection of the user input device control associated with the first graphical element causes the rendering in the display device of the first content at the computer address associated with the first graphical element associated with the selected input device control.

8. The method of claim 1, wherein the operations of generating the first graphical element, determining the computer address, associating the first graphical element, receiving user selection of the first graphical element in the user page, and rendering the first content at the computer address associated with the selected first graphical element within the user page are performed by a user page program.

9. The method of claim 1, wherein the element information for the first and second user element entries indicates a size and position of the first and second graphical elements, respectively, rendered in the user page.

10. The method of claim 9, further comprising:
    receiving user input indicating modification of the size and position in the user page of at least one of the first and second graphical elements added to the user page; and
    rendering the at least one of the first and second graphical elements for which the user input indicating the modification was received according to the indicated modified size and position.

11. The method of claim 1, further comprising:
    receiving via the computer user interface user selection of the first graphical element within the user page;
    rendering in the display device content loaded from the computer address associated with the selected first graphical element in response to user selection of the first graphical element in the user page;
    receiving via the computer user interface user selection of the second graphical element within the user page; and
    launching the application program at the executable computer address associated with the selected second graphical element to render in the display device the second content in response to user selection of the second graphical element in the user page.

12. A system coupled to a display device, comprising:
    a processor;
    a computer user interface; and
    a program executed by the processor to perform operations, the operations comprising:
        receiving user selection via the computer user interface of a first portion of first content downloaded from a computer address and rendered within a browser page rendered in the display device;

generating a first graphical element including a rendering of the selected first portion of the first content in response to receiving the user selection, wherein the first graphical element provides a visual representation of a first image of the selected first portion of the first content;

receiving user selection of a second portion of second content rendered from an application program executing in the computer;

generating a second graphical element including a rendering of the second portion of the second content in response to receiving the user selection, wherein the second graphical element provides a visual representation of a second image of the selected second portion of the second content;

generating a first user element entry in user element information associating the generated first graphical element and the computer address;

generating a second user element entry in the user element information associating the generated second graphical element and an executable application address of the application program in the computer; and for each of the user element entries in the user element information, rendering the generated graphical element to in user page in response to receiving user selection to invoke the user page.

13. The system of claim 12, wherein the application program comprises an embedded application within the browser page.

14. The system of claim 13, further comprising:
receiving user input indicating modification of the size and position in the user page of at least one of the first and second graphical elements added to the user page; and
rendering the at least one of the first and second graphical elements for which the user input indicating the modification was received according to the indicated modified size and position.

15. The system of claim 12, wherein the operations further comprise:
receiving via the computer user interface user selection of the first graphical element within the user page;
rendering in the display device content loaded from the computer address associated with the selected first graphical element in response to user selection of the first graphical element in the user page;
receiving via the computer user interface user selection of the second graphical element within the user page; and
launching the application program at the executable computer address associated with the selected second graphical element to render in the display device the second content in response to user selection of the second graphical element in the user page.

16. The system of claim 12, wherein the element information for the first and second user element entries indicates a size and position of the first and second graphical elements, respectively, rendered in the user page.

17. An article of manufacture comprising a computer readable storage medium having computer program code that when executed by a computer causes operations to be performed and renders information for a computer user interface rendered in a display device, wherein the operations comprise:

receiving user selection via the computer user interface of a first portion of first content downloaded from a computer address and rendered within a browser page rendered in the display device;

generating a first graphical element including a rendering of the selected first portion of the content in response to receiving the user selection, wherein the first graphical element provides a visual representation of a first image of the selected first portion of the first content;

receiving user selection of a second portion of second content rendered from an application program executing in the computer;

generating a second graphical element including a rendering of the selected second portion of the second content in response to receiving the user selection, wherein the second graphical element provides a visual representation of a second image of the selected second portion of the second content;

generating a first user element entry in user element information associating the generated first graphical element and the computer address;

generating a second user element entry in the user element information associating the generated second graphical element and an executable application address of the application program; and for each of the user element entries in the user element information, rendering the generated graphical element in the user page in response to receiving user selection to invoke the user page.

18. The article of manufacture of claim 17, wherein the application program comprises an embedded application within the browser page.

19. The article of manufacture of claim 17, wherein the operations further comprise:
receiving via the computer user interface user selection of the first graphical element within the user page;
rendering in the display device content loaded from the computer address associated with the selected first graphical element in response to user selection of the first graphical element in the user page;
receiving via the computer user interface user selection of the second graphical element within the user page; and
launching the application program at the executable computer address associated with the selected second graphical element to render in the display device the second content in response to user selection of the second graphical element in the user page.

20. The article of manufacture of claim 17, wherein the element information for the first and second user element entries indicates a size and position of the first and second graphical elements, respectively, rendered in the user page.

21. The article of manufacture of claim 20, wherein the operations further comprise:
receiving user input indicating modification of the size and position in the user page of at least one of the first and second graphical elements added to the user page; and
rendering the at least one of the first and second graphical elements for which the user input indicating the modification was received according to the indicated modified size and position.

* * * * *